Patented July 4, 1950

2,513,820

UNITED STATES PATENT OFFICE 2,513,820

POLYMERIZATION OF VINYL ETHERS

Calvin E. Schildknecht, Easton, Pa., assignor to General Aniline & Film Corporation, New York, N. Y., a corporation of Delaware No Drawing. Application February 21, 1945, Serial No. 579,167

12 Claims. (Cl. 260—803)

The present invention relates to the polymerization of vinyl ethers and particularly to the preparation of solid, rubberlike, form-stable polyvinyl ethers and the copolymers thereof.

The commercial development of the vinyl ether polymers and their copolymers has been considerably retarded due to the unusual difficulties in polymerizing the monomers to uniform high molecular weight rubberlike, form-stable products, and this is particularly true of the vinyl isopropyl and vinyl-n-butyl ethers. Thus the usual methods of heat polymerization with peroxide catalysts as applied to many other vinyl monomers are unsuccessful. The same is true of the polymerization with acid-reacting catalysts at relatively low temperatures.

USP 2,104,000 proposes to polymerize vinyl ethers with an acid-reacting catalyst at a temperature ranging from about 10 to 120° C. while employing a solvent-diluent and while adding the catalyst portion-wise to the monomer. The patentee, however, indicates that the products which are thus produced are from liquid to solid substances, the vinyl-n-butyl polymer being characterized as a colorless, honey-like, highly viscous and sticky product. As is to be expected, the high molecular weight, rubberlike, form-stable polymers have properties which are considerably different from the low molecular weight, honey-like, viscous products of the prior art. This difference in properties is reflected by the differences in the uses to which the two types of polymers may be put. The high polymers are rubber substitutes of special utility as pressure-sensitive adhesives for surgical adhesive tapes and the like. The low polymers on the other hand are only useful as plasticizers, wax modifiers and as contact adhesives. If during the polymerization of a vinyl ether monomer the conditions employed are conducive of the formation of the low and high polymers, the resultant mixture has physical properties intermediate the high and low polymer forms. Such mixtures are of indefinite composition and of little commercial value. Attempts to separate the low polymer from the high polymer in such mixtures have met with little success.

I have ascertained by experiment that even if the process of the prior art previously referred to be carried out at lower temperatures than those reported in the patent, while otherwise following the directions of the patent, it is not possible to obtain the rubberlike, form-stable products desired. While it is possible when so lowering the temperature, to obtain products which appear fairly rubbery and solid at room temperature, they become soft and plastic when heated to 100° C. even for short periods of time. The substantially pure high polymers, however, like vulcanized rubber, are little affected by heating to this temperature unless the heating be unduly prolonged.

It has been stated that in the prior art patent the utilization of a solvent-diluent is recommended. According to the patent, the polymer is recovered from the diluent by boiling off the same. It has been my findings that when polymerizing vinyl ether monomers even while observing the greatest care and while utilizing very low temperatures for the reaction, there is formed along with the high polymer a certain quantity of the low polymer. This is due to local overheating resulting from rapid exothermic polymerization around a new drop of added catalyst. Consequently, when the polymer is isolated as proposed in the patent by distilling off the solvent-diluent, an inter-mixture of the high and low polymer ensues. Such a product does not partake of the characteristics of the high polymer but reflects the properties of both the high and low polymers. Such products, as previously noted, are of little commercial value.

I have now discovered that uniform high molecular weight, rubberlike, form-stable vinyl ether polymers and copolymers can be obtained by polymerizing the monomers with an acid-reacting catalyst at a low temperature providing that the reaction is effected in the presence of a solvent-diluent which has a selective solvent action on the low molecular weight polymer at the temperature of the reaction. By proceeding in this way, it is possible to isolate the high molecular weight polymer from the solution of the low molecular weight polymer at the reaction temperature or at a temperature below the boiling point of the solvent-diluent. A mixture of the high molecular weight and low molecular weight polymers is thus avoided. By subsequently distilling the solvent from the low molecular weight polymer, batches of both the high and low molecular weight polymer may be separately obtained. Since both are satisfactory for industrial uses, they may both be employed commercially.

It is accordingly an object of my invention to produce uniform high molecular weight, rubberlike polyvinyl ethers and copolymers thereof.

It is a further object of my invention to produce uniform high molecular weight, rubberlike, form-stable polyvinyl ethers by polymerizing the monomers at low temperatures with an acid-reacting catalyst in the presence of a solvent-diluent which has a selective solvent action on the low molecular weight polymers produced in the reaction.

It is a further object of my invention to produce by a continuous process, uniform high molecular weight, rubberlike, form-stable polyvinyl ethers by effecting the polymerization with an acid-reacting catalyst at a low temperature in the presence of a solvent-diluent which has a selective solvent action on the low molecular weight polymer produced in the polymerization.

A further object of my invention is to polymerize vinyl isopropyl and vinyl-n-butyl ethers to their uniform high molecular weight, rubberlike, form-stable polymers by effecting the polymerization at low temperatures with an acid-reacting catalyst in the presence of a solvent-diluent which has a selective solvent action on the low molecular weight polymers at the temperature of the reaction.

Other and further important objects will become apparent as the description proceeds.

My process may be applied to the polymerization of any of the vinyl ethers, such as the vinyl methyl, vinyl ethyl, vinyl propyl, vinyl isopropyl, vinyl-n-butyl, vinyl isobutyl, vinyl hexyl, vinyl octyl and the like. It is, however, particularly applicable to the vinyl isopropyl and vinyl-n-butyl ethers since in the polymers of these ethers the chain length very greatly affects important physical properties such as tack and plasticity. The process may also be employed for copolymerizing two or more of the vinyl ethers or for copolymerizing a vinyl ether with another monomeric polymerizable compound such as isobutylene, butadiene and the like.

The temperature at which the reaction is effected will vary depending on the particular vinyl ether which is employed as the parent material. Generally speaking, however, the temperature will range from $-10$ to $-100°$ C. Where the ether employed is the vinyl isopropyl or vinyl-n-butyl ether, the temperature should range from $-45$ to $-100°$ C. and preferably from $-70$ to $-100°$ C. These desired temperatures may be maintained by the utilization of refrigerants such as solid carbon dioxide, liquefied ethylene and the like.

The polymerization may be carried out with any of the usual acid-reacting catalysts such as tin tetrachloride, stannous chloride, aluminum chloride, iron chloride, zinc chloride, sulfuric acid, hydrochloric acid, sulfur dioxide, and the like. The preferred catalysts are, however, boron halides such as boron trifluoride, boron trifluoride and their complexes with ethers (see Gmelin's Handbuch der Anorganische Chemie, volume Boron, (8th edition), pages 114 et seq.). Examples of the ethers which may be utilized to form the boron halide complexes are diethylether, dipropylether, ethylmethylether, dibutylether, diamylether and the like. The catalysts are utilized in relatively small amounts, for instance, in the proportion given to USP 2,104,000.

The solvent diluents which I have found to be effective for my purpose are normally gaseous aliphatic hydrocarbons which have a melting point lower than that of the reaction temperature and which have a selective solvent action on the low molecular weight polymer at the reaction temperature. It may be ascertained by a simple test when the solvent diluent has the desired solvent properties. Examples of solvent diluents falling within the above category are ethane, ethylene and propane. Butane may also be employed, particularly in the polymerization of vinyl-n-butyl ether. The results achieved with the butane, however, are not as good as with propane because butane having better solvent properties than the propane, the cleavage between the low molecular weight polymers and the high molecular weight polymers is not as clear-cut with the butane. However, the results procured with the butane are in general satisfactory.

The reaction may be carried out by adding the catalyst to the monomer or the monomer to the catalyst. The addition of the one of the reagents to the other is preferably portionwise so as to reduce local overheating, which favors the formation of the low molecular weight polymers. Danger of local overheating may be further minimized by pre-cooling both the monomer and catalyst to the reaction temperature before they are brought into contact.

A particular advantage of operating with solvent diluents of the type stated is that their use permits the polymerization to be carried out continuously. Thus the diluent containing the dissolved low polymer may be pumped from the reactor, vaporized to recover the low polymer, and after condensation, returned to the reactor. Or the insoluble high polymer may be continuously dipped out of the reaction vessel as it is formed.

After the reaction is completed, particularly if the process be a batch process, it is advisable to deactivate the catalyst, a procedure which will hereinafter be referred to as "quenching." This result is accomplished by adding to the catalyst at a low temperature such as that at which the reaction is carried out an alkali such as ammonium hydroxide, sodium hydroxide, potassium hydroxide, an organic amine such as methylamine, diethylamine, ethanolamine, diethanolamine, pyridine and the like, alcohols such as methanol, ethanol, butanol and the like, carbonyl compounds such as acetone, methylethyl ketone, acetaldehyde and the like. Should it transpire that any of these agents freeze at the quenching temperature, solidification may be avoided by employing with the quenching agent an amount of the solvent-diluent used in the reaction.

After inactivation, the catalyst may be removed by washing the reaction mixture if desired under pressure and at room temperature with water rendered alkaline by the addition of ammonium hydroxide or the like. By causing the quenching to take place at very low temperatures, it is insured that there will be no conversion of any residual monomer at a temperature at which the undesirable low molecular weight products are formed.

The particular significance of my invention may be further appreciated by the fact that it permits better heat control of the reaction. It is known that low temperatures favor the formation of the high molecular weight polymers. If a diluent be used for the reaction in which the high molecular weight polymer is soluble, the reaction mixture tends to become more and more viscous as the polymerization progresses due to the dissolution of the high polymer in the diluent. This makes it practically impossible to maintain a uniform low reaction temperature because of poor heat transfer. Moreover, this objection cannot be avoided by omitting a solvent-diluent since the high molecular weight polymers are soluble in their respective monomers so that the same difficulty with regard to heat dissipation is encountered.

The high molecular weight products of the present invention and particularly those produced from the vinyl isopropyl ethers and the vinyl-n-butyl ethers are spongy, elastic and tenacious solids in contrast to the polymers of the prior art. They show substantially reversible extensibility similar to partially vulcanized rubber. Although the polymers are not sticky to the touch, they exhibit tack when brought into contact by pressure with other surfaces.

The low polymers as contemplated herein and which are soluble in the solvent-diluent, may be defined as those having an intrinsic viscosity below 1 (as measured in a benzene solution) while the high polymers are those having intrinsic viscosities higher than 1 and in most cases as high as 10 or more.

The invention is further illustrated by the following examples although it is to be understood that the invention is not restricted thereto. The parts are by weight unless otherwise stated.

*Example I*

To a mixture of 200 parts of purified vinyl-n-butyl ether, 600 parts of liquefied propane and 750 parts of granular Dry Ice, there is added with mechanical agitation, a purified diethylether-boron trifluoride complex (cooled to approximately $-50°$ C.) at a constant rate of .10 part per minute. After an hour, the reaction is complete and the mixture is filtered at a temperature of about $-70°$ C. The high polymer is washed with water to remove catalyst residues and after drying is milled with stabilizers, pigments and other conventional materials to give a rubber substitute. The liquid propane from the low temperature filtration is allowed to boil away leaving a sticky, soft product comprising a low viscosity polyvinyl-n-butyl ether.

*Example II*

To a mixture of 200 parts of vinyl-n-butyl ether, 600 parts of propane and 750 parts of Dry Ice in a reactor surrounded by Dry Ice-methanol mixture maintained at $-80°$ C., there are added dropwise 5 parts of a catalyst comprising diethylether-boron trifluoride maintained at room temperature. The reaction is completed in an hour and there is then added to the reaction mixture for the purpose of deactivating the catalyst, 10 parts of concentrated aqueous ammonia (28%) pre-cooled to $-50°$ C. In order to make the slurry of high polymer in propane more amenable to agitation, there are added 300 parts of liquid propane at $-60°$ C. and the reaction mixture is then stirred. The liquid propane containing the dissolved low polymer is removed by filtration and the light propane allowed to distill off to recover the low molecular weight polymer dissolved therein. Under these conditions, the high molecular weight polymer is obtained in a yield of 85% and the low polymer in a yield of 1.5%.

*Example III*

Boron trifluoride gas is passed into an agitated mixture of 200 parts of vinyl-n-butyl ether and 800 parts of liquid propane in a vessel cooled to $-80°$ C. After completion of the reaction, the reaction mixture is filtered while maintaining a temperature below the boiling point of propane to remove the solid high molecular weight polymer. The low molecular weight polymer is recovered from the propane by boiling away the propane. The low polymer is a sticky, viscous product, whereas the high polymer is a form-stable, rubbery material.

*Example IV*

The process is carried out as in Example I with the exception that the high polymer is removed in portions as it is formed by dipping it from the reactor with a strainer. The low polymer is recovered by boiling off the propane from the propane solution.

*Example V*

To a mixture of 600 parts of liquefied propane and 4 parts of diethylether-boron fluoride maintained at $-78°$ C. is added dropwise while stirring, 200 parts of vinyl-n-butyl ether pre-cooled to $-76°$ C. After the reaction is completed, 20 parts of pre-cooled 28% ammonium hydroxide are added. The mixture is filtered below the boiling temperature of propane to effect separation of the high and low polymers.

*Example VI*

To a mixture of 200 parts of vinyl isopropyl ether and 800 parts of ethylene maintained at approximately $-100°$ C. is added dropwise diethylether-boron trifluoride complex. After completion of the reaction the liquid ethylene containing the dissolved low polymer is drawn off. A rubbery high molecular polymer remains in the reactor.

*Example VII*

The process is the same as in Example I except that the monomer is vinyl isopropyl ether and the catalyst is boron trichloride.

*Example VIII*

The process is the same as in Example I except that the monomer consists of a mixture of equal parts of vinyl-n-butyl ether and vinyl isobutyl ether.

*Example IX*

Equal parts of diethyl ether-boron trifluoride and diethyl ether maintained at room temperature are added dropwise to a mixture containing 900 parts of propane, 200 parts of vinyl isopropyl ether and 65 parts of butadiene maintained at a temperature of $-80°$ C. After 4.5 parts of the catalyst mixture have been added, about an hour is allowed for the polymerization to go to substantially complete. There are then added 20 parts of concentrated aqueous ammonium hydroxide (28%). The liquid propane phase containing dissolved low polymer and residual unreacted monomer is separated by filtration below the boiling point of propane. The propane is distilled and recovered, leaving a sticky semi-solid low polymer. The high polymer is a white, rubbery solid comprising a copolymer of vinyl isopropyl ether and butadiene.

Various modifications of the invention will become apparent to those skilled in the art, and hence I do not intend to be limited in the patent granted except as required by the prior art and the appended claims.

I claim:
1. The process for the production of uniform high molecular weight rubberlike, form-stable vinyl ether polymers which comprises polymerizing a vinyl ether at a temperature below $-10°$ C. with an acid-reacting catalyst in a solvent diluent comprising a normally gaseous aliphatic hydrocarbon having a selective solvent action for the lower weight polymers formed in the reaction, at a temperature below the boiling point of said solvent-diluent and isolating the higher molecular weight form-stable polymer from the solution of the lower molecular weight polymer at a temperature below the boiling point of said solvent-diluent.

2. The process as defined in claim 1 wherein the vinyl ether is copolymerized with another monomeric copolymerizable vinyl compound.

3. The process of producing uniform high molecular weight rubberlike, form-stable vinyl ether polymers which comprises polymerizing a vinyl ether at a temperature below $-10°$ C. with an acid-reacting catalyst while effecting contact between the reagents portion-wise in a solvent-diluent comprising a normally gaseous aliphatic hydrocarbon having a selective solvent action for the lower weight polymers formed in the reaction, at a temperature below the boiling point of said solvent diluent, and isolating the high molecular weight solid polymer from the solution of the lower molecular weight polymer at a temperature below the boiling point of said solvent diluent.

4. The process as defined in claim 1 wherein said solvent-diluent contains from two to four carbon atoms and at least four hydrogen atoms.

5. The process as defined in claim 3 wherein said solvent-diluent contains from two to four carbon atoms and at least four hydrogen atoms.

6. The process for producing uniform high molecular weight rubberlike,, form-stable polyvinyl isopropyl ethers which comprises polymerizing vinyl isopropyl ether at a temperature ranging from $-45$ to $-100°$ C. with a boron halide catalyst in a solvent diluent comprising a normally gaseous aliphatic hydrocarbon having a selective solvent action for the lower weight polymers formed in the reaction, at a temperature below the boiling point of said solvent-diluent, and isolating the high molecular weight polyvinyl isopropyl ether from the solution of the lower molecular weight polymer at a temperature below the boiling point of said solvent diluent.

7. The process of producing uniform high molecular weight rubberlike, form-stable polyvinyl n-butyl ethers which comprises polymerizing vinyl n-butyl ether at a temperature ranging from $-45$ to $-100°$ C. with a boron halide catalyst in a solvent diluent comprising a normally gaseous aliphatic hydrocarbon having a selective solvent action for the lower weight polymers formed in the reaction, at a temperature below the boiling point of said solvent-diluent, and isolating the high molecular weight polyvinyl n-butyl ether from the solution of the lower molecular weight polymer at a temperature below the boiling point of said solvent-diluent.

8. The process as defined in claim 6 wherein the solvent-diluent contains from two to four carbon atoms and at least four hydrogen atoms.

9. The process as defined in claim 7 wherein the solvent-diluent contains from two to four carbon atoms and at least four hydrogen atoms.

10. The process of producing high molecular weight, rubber-like, form-stable polyvinyl n-butyl ethers which comprises polymerizing vinyl n-butyl ether with diethylether-boron trifluoride complex at a temperature of $-70°$ C. in liquid propane, and isolating the solid polymer from the solution of the lower weight polymer formed in the reaction at a temperature below the boiling point of the liquid propane.

11. The process of producing high molecular weight rubberlike, form-stable polyvinyl isopropyl ethers which comprises polymerizing vinyl isopropyl ether with diethylether-boron trifluoride complex as the catalyst at a temperature of approximately $-100°$ C. in liquefied ethylene and isolating the solid high molecular weight polymer from the solution of the lower molecular weight polymer at a temperature below the boiling point of said ethylene.

12. The process of producing high molecular weight form-stable, rubberlike copolymers of vinyl isopropyl ether and butadiene which comprises copolymerizing the ether and butadiene by means of a catalyst comprising a mixture of equal parts of di-ethyl ether-boron trifluoride and diethylether at a temperature of $-80°$ C. in liquefied propane and isolating the solid high molecular weight polymer from the solution of the low molecular weight polymer at a temperature below the boiling point of the liquefied propane.

CALVIN E. SCHILDKNECHT.

REFERENCES CITED

The following references are of record in the file of this patent:

UNITED STATES PATENTS

| Number | Name | Date |
|---|---|---|
| 2,016,490 | Fikentscher | Oct. 8, 1935 |
| 2,061,934 | Mueller-Cunradi | Nov. 24, 1936 |
| 2,311,567 | Otto | Feb. 16, 1943 |
| 2,378,138 | Gaylor | June 12, 1945 |
| 2,379,656 | Ruthruff | July 3, 1945 |
| 2,380,474 | Stewart | July 31, 1945 |